United States Patent [19]

Ishii et al.

[11] 4,048,656
[45] Sept. 13, 1977

[54] FACSIMILE DATA COMPRESSION METHOD

[75] Inventors: Atsushi Ishii; Kiyoshi Oikawa; Tadaaki Suzuki, Kawasaki; Tetsuro Morita, Tokyo; and Yoshio Iizuka, Sagamihara, all of Japan

[73] Assignee: Fujitsu Limited, Kawasaki, Japan

[22] Filed: Dec. 18, 1975

[21] Appl. No.: 641,900

[30] Foreign Application Priority Data
Dec. 23, 1974 Japan .................................. 50-2642

[52] U.S. Cl. .................................................. 358/261
[51] Int. Cl.[2] ........................ H04N 1/40; H04N 7/12
[58] Field of Search ..178/6, 6.8, Dig. 3; 358/260, 261

[56] References Cited
U.S. PATENT DOCUMENTS

| | | | |
|---|---|---|---|
| 3,916,095 | 10/1975 | Weber | 178—6 |
| 3,804,975 | 4/1974 | Abe | 178—6 |
| 3,801,737 | 4/1974 | Komura | 178—6 |

*Primary Examiner*—Howard W. Britton
*Attorney, Agent or Firm*—Staas & Halsey

[57] ABSTRACT

A method for compressing, transmitting and reproducing facsimile data using data bits of picture elements which are included in a plurality of scanning lines, which method reduces the required bandwidth in order to transmit said facsimile data. In this method, at least one status of a data bit which is positioned at the head of serial data bits obtained by scanning said facsimile data is changed to a reference status, or a reference status is placed before said serial data bits. As the status of the first data bit of the serial data bits is predetermined, it is not necessary to send information of the status of the first data bit to a receiving side, so that the information of the facsimile data can be transmitted by one synchronizing code, transition codes or modes and run length codes. In this way, a mode code which represents the status of the first data bit of the serial data bits need not be sent.

17 Claims, 14 Drawing Figures

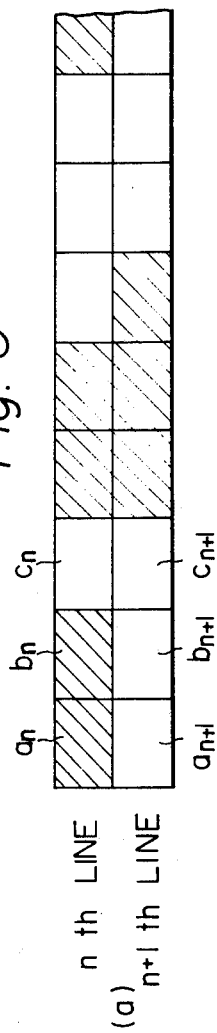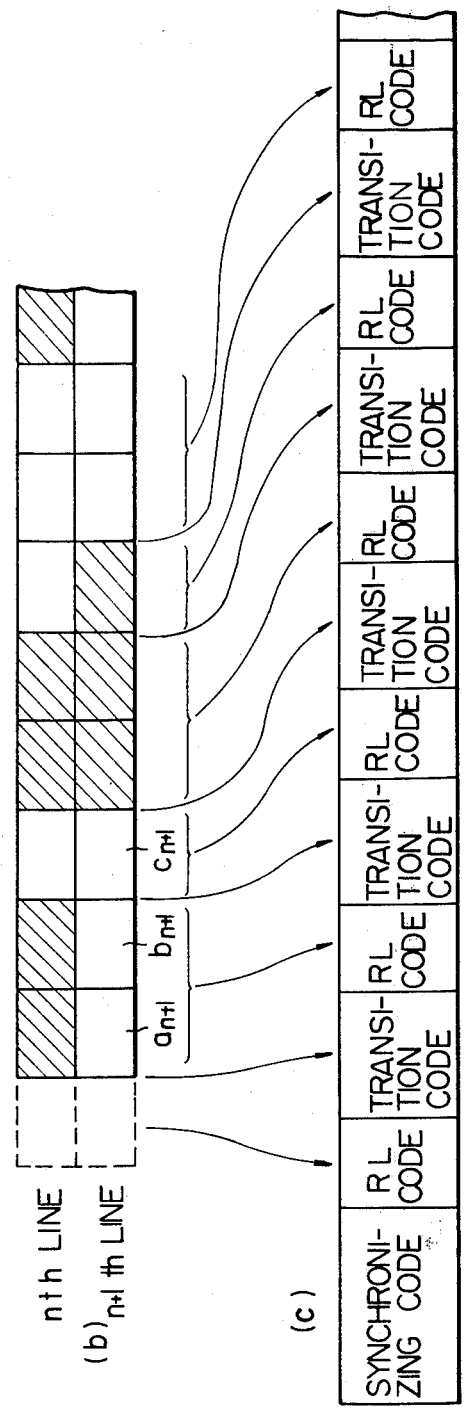
Fig. 3

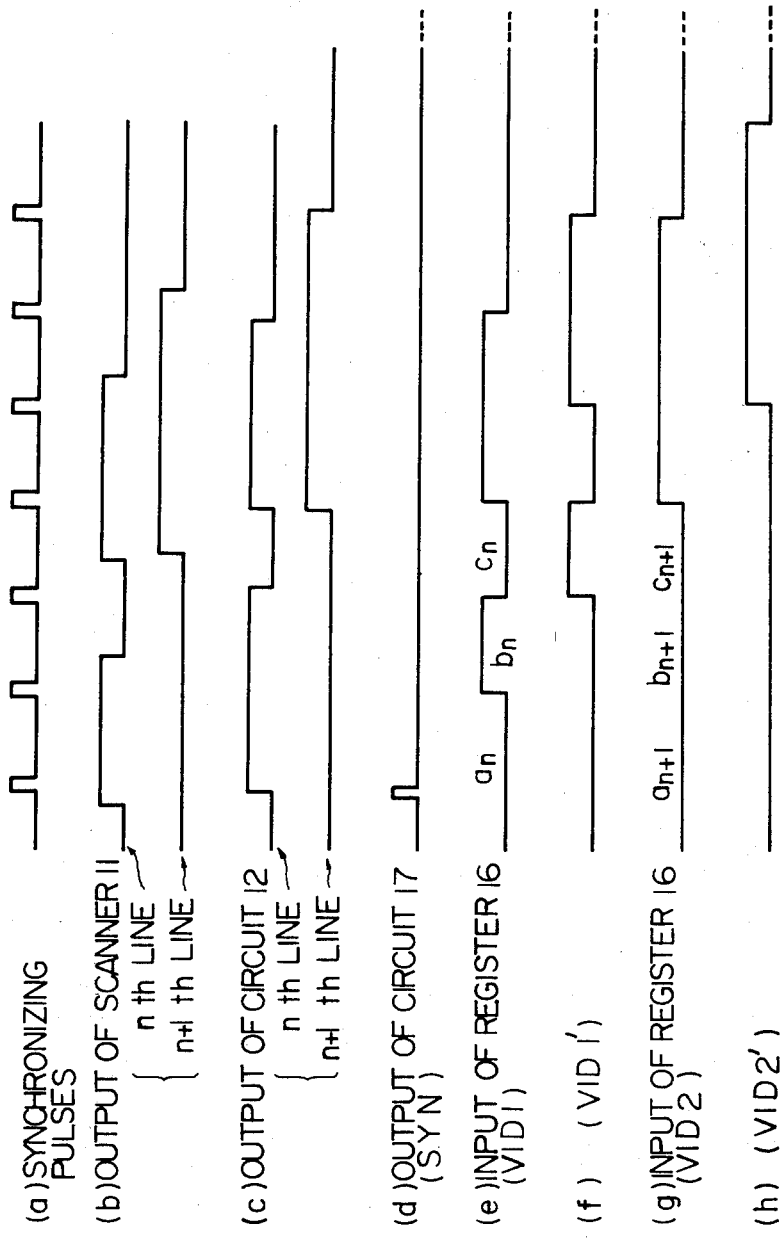

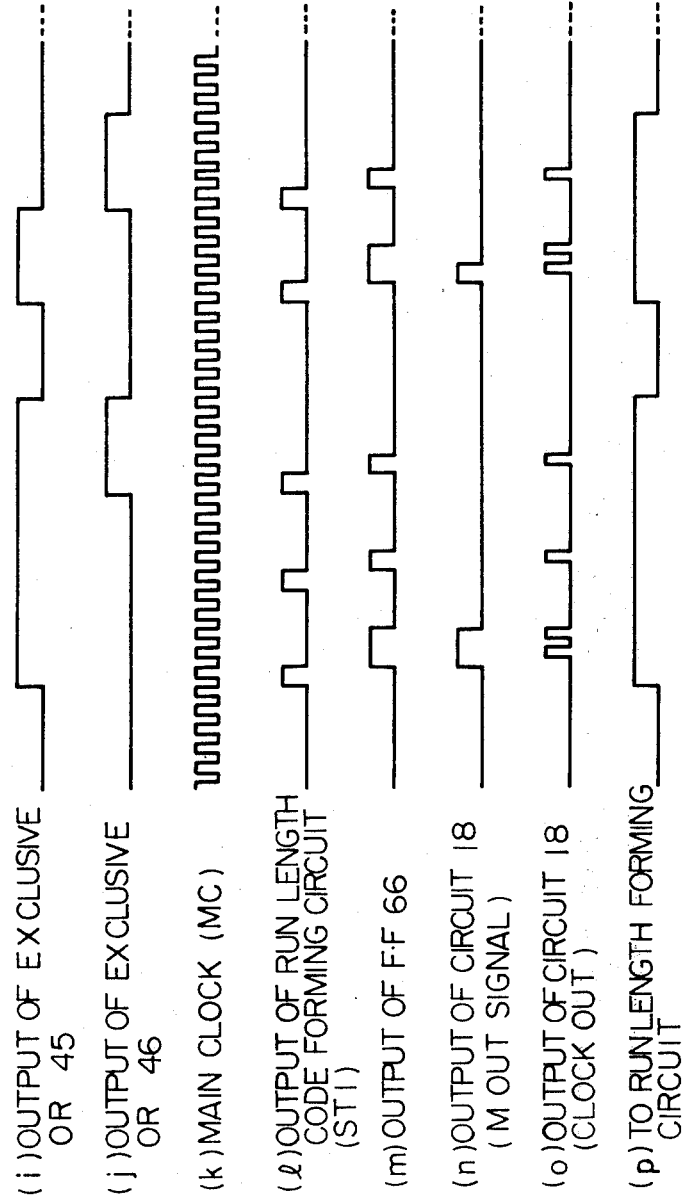

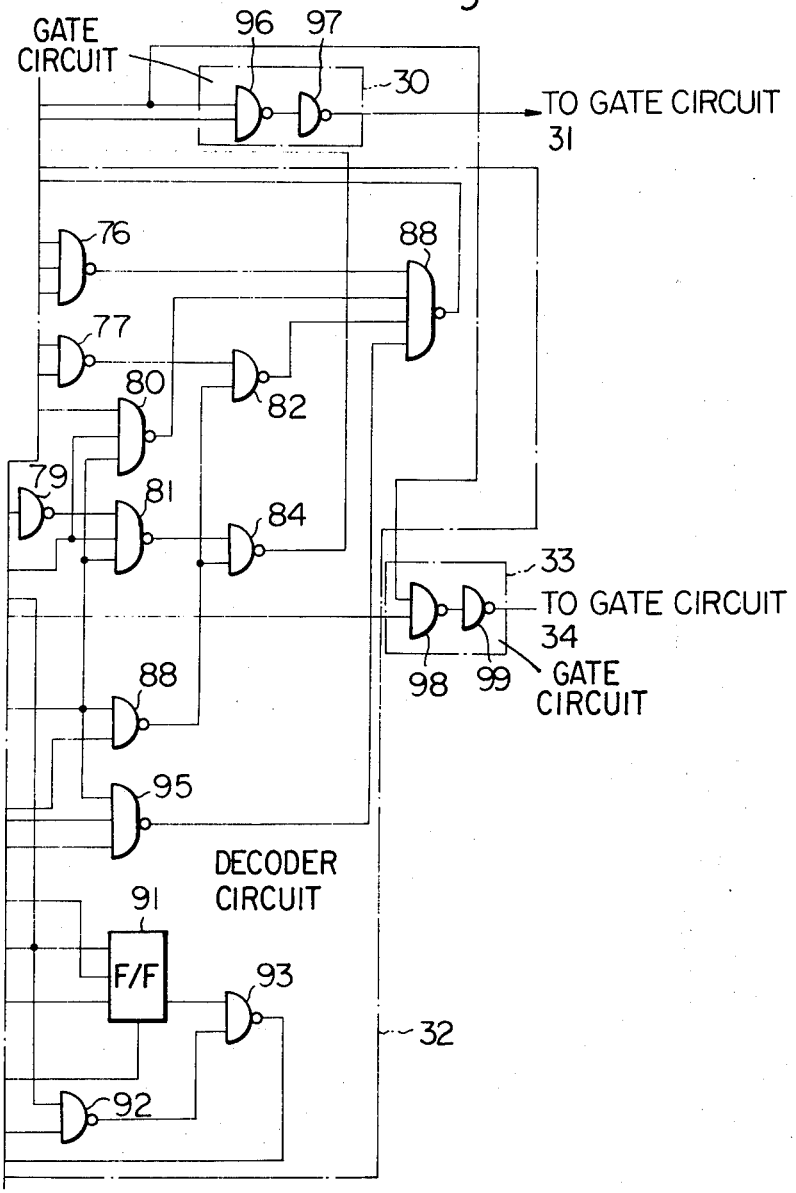

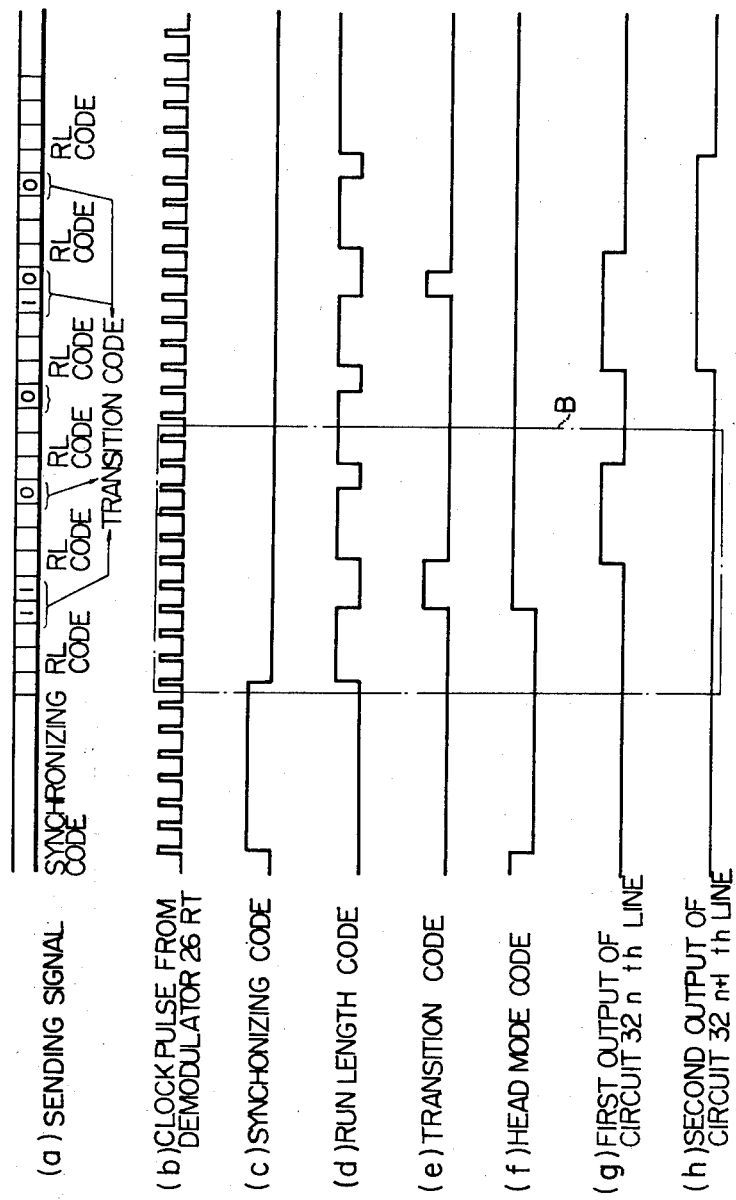

FACSIMILE DATA COMPRESSION METHOD

DETAILED EXPLANATION OF THE PRESENT INVENTION

The present invention relates to a facsimile data compression method, and more particularly, to a method for compressing, transmitting and reproducing facsimile data with high compression efficiency, using a simple circuit.

The facsimile reproduction and systems which transmit the information of the facsimile data to a remote place are basically composed of types of scanning apparatuses which scan the surface of data to be reproduced and encoding means for limiting the bandwidth required for the transmission of said data. The encoded data is then transmitted to a remote receiver which decodes the transmitted information and supplies said decoded data to a printing mechanism which reproduces a facsimile of the original document.

For the purpose of compressing the bandwidth required for the transmission of data, conventional facsimile data compression methods utilize the first dimensional correlation and the second dimensional correlation. For example, run length codes are conventionally used as the first dimensional correlation, and a method which estimates the information of one picture element from the information of an adjacent picture element is conventionally used as the second correlation. In such a conventional facsimile data compression system, the information of the identification code which identifies the head status of the picture elements must be transmitted. Therefore, many bits are required for transmitting the identification code and a high compression efficiency cannot be obtained. Further, special circuits are required in order to form and reproduce the identification code, which makes the construction of the circuit complex.

The object of the present invention is to remove the above-mentioned drawbacks and to provide a facsimile data compression method which can transmit the information without using the head status identification code.

To achieve the above-mentioned object, the characteristic feature of the present invention is to change the status of at least one data bit which is positioned at the head of serial data bits obtained by scanning the facsimile data, to a predetermined reference status, or to place a predetermined reference status before the serial data bits, thereby eliminating the need to send the information regarding the status of the first data bit of said serial data bits.

Further features and advantages of the present invention will be apparent from the ensuing description with reference to the accompanying drawings to which, however, the scope of the invention is in no way limited.

FIG. 3 is a diagram illustrating another embodiment of the facsimile data compression method according to the present invention.

FIGS. 7a and 7b are diagrammatic views of the waveforms appearing at various points in the block diagram shown in FIG. 4 and of the circuit shown in FIG. 6.

FIGS. 8a and 8b are a detailed circuit of a part of the decoder circuit and gate circuits of the block diagram shown in FIG. 5.

FIGS. 9a and 9b are diagrammatic views of waveforms at various points in the block diagram shown in FIG. 5 and of the circuit shown in FIG. 8, respectively.

Figure 1:
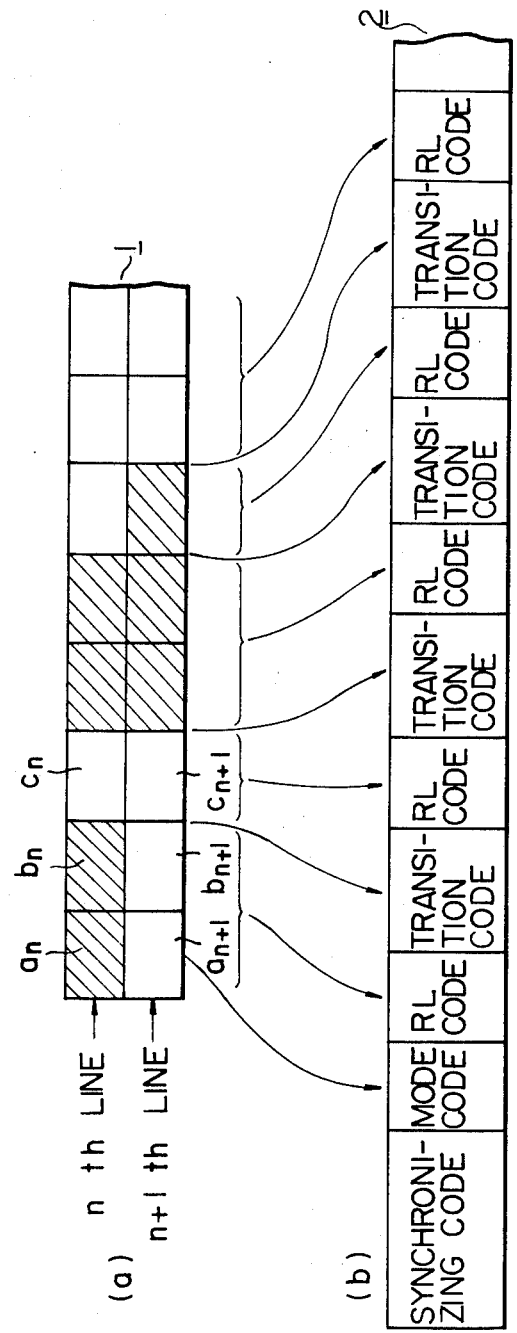
FIG. 1 is a diagram illustrating one example of the conventional facsimile data compression method.

Referring now to FIG. 1, a conventional facsimile data compression method using a dual line encoding algorithm, is partially illustrated. As shown in (a) of FIG. 1, in the facsimile data compression method using a dual line, a picture to be sent is divided into alphabetically designated scanning colums $a_n$, $b_n$, $c_n$, . . . ; $a_{n+1}$, $b_{n+1}$, $c_{n+1}$, . . . and numerically designated rows $a_n$, $a_{n+1}$, . . . ; $b_n$, $b_{n+1}$, . . . ; $c_n$, $c_{n+1}$, . . . . The data contained in the upper elemental area on one line (i.e., the $n$th line) and adjacent lower elemental area (i.e., the $n+1$th line) lying therebeneath are treated as one unit area. That is, the above-mentioned unit area is composed of picture elements $a_n$, $a_{n+1}$,; $b_n$, $b_{n+1}$,; $c_n$, $c_{n+1}$; . . . shown in FIG. 1. According to said facsimile data compression method, there are four possible statuses of said unit area. That is, there will be a white-white data pair if both elemental areas are white, a black-black data pair if both elemental areas are black, a black-white data pair if the upper elemental area is black and the lower elemental area is white; and a white-black data pair if the upper elemental area is white and the lower elemental area is black. When this facsimile data is sent to a remote place, the status of said unit area and transitions of said status are coded one after another. For example, with respect to the successive transition of the status of said unit area, the transition mode codes shown in Table I are utilized.

TABLE I

| $\dfrac{a_n\ \ b_n}{a_{n+1}\ \ b_{n+1}}$ | White-black | Black-black | Black-white | White-black |
|---|---|---|---|---|
| White-white | x | 10 | 11 | 0 |
| Black-black | 0 | x | 10 | 11 |
| Black-white | 0 | 10 | x | 11 |
| White-black | 0 | 10 | 11 | x |

As shown in (b) of FIG. 1, when the facsimile data is sent, the coded signal is composed of a synchronizing code which synchronizes two scanning lines; a mode code which identifies the status of the first unit area of a series of the unit areas; a run length code which represents the running length of the status of the first unit area; transition mode codes which identify the status of the unit area; and run length codes which identify the running length of the status of a new unit area. For example, with respect to (b) of FIG. 1, the following coded signal would be sent: synchronizing code + mode code (11) + run length code (001) + transition code (0) + run length code (000) + transition code (10) + run length code (001) + transition code (11) + run length code . . . .

In a conventional facsimile data compression system, a mode code which identifies the status of the first unit area would be required. Therefore, many bits are required to transmit said mode code and because of this, high compression efficiency cannot be obtained. Further, many circuits are required in order to form and reproduce the mode code, which increases the complexity of the construction of the circuit.

Figure 2:
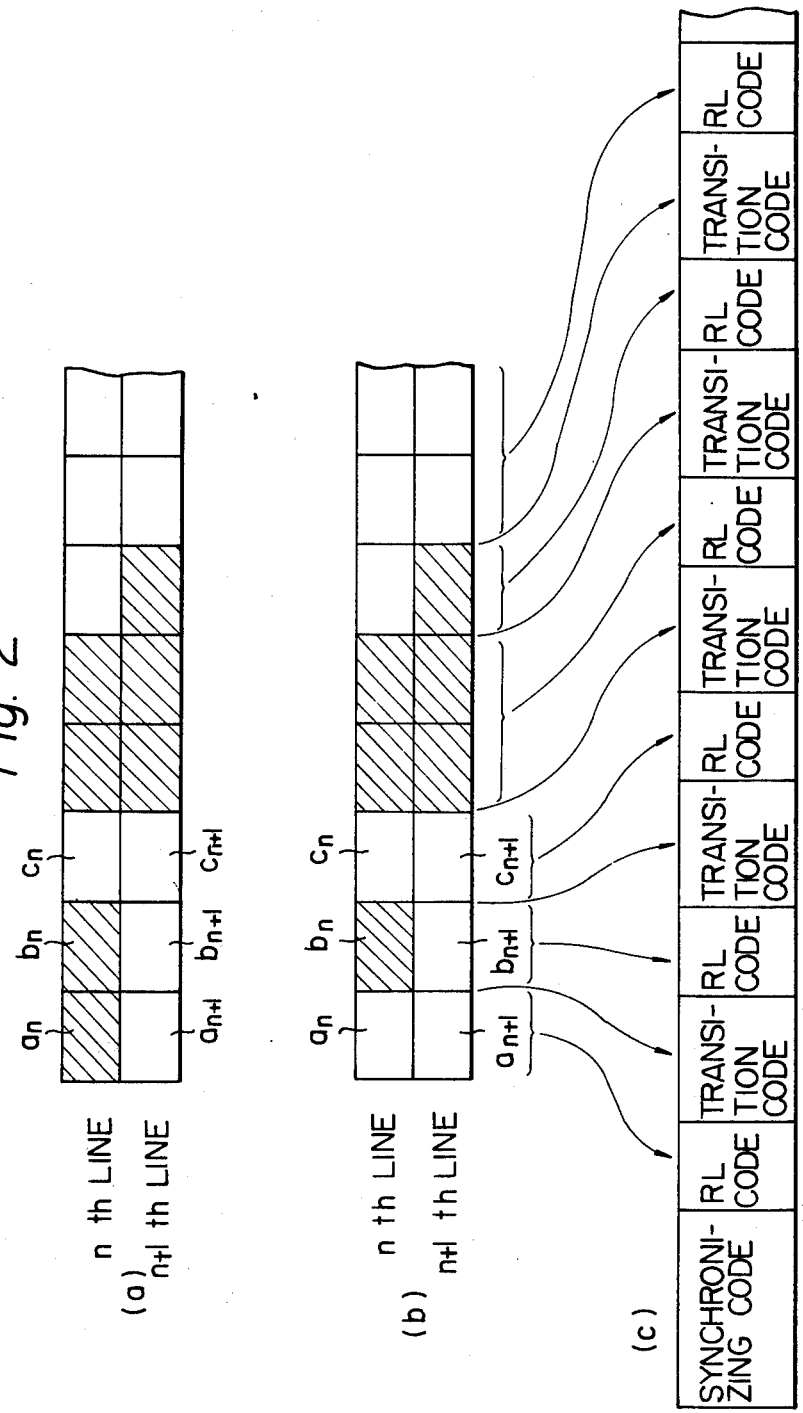
FIG. 2 is a diagram illustrating one embodiment of the facsimile data compression method according to the present invention.

FIG. 2 is an example of the facsimile data compression method according to the present invention. With reference to (a) of FIG. 2, a first unit area of the dual line is transformed to a reference status (white-white) as shown in (b) of FIG. 2. Referring to (b) of FIG. 2, a picture to be sent is divided into alphabetically designated scanning columns and numerically designated rows, and the data contained in both the upper elemental area ($n$th line) and in an adjacent lower elemental area ($n+1$th line) are treated as one unit area, the same as was shown in (a) of FIG. 1. The status of the unit area may be any one of four possible data statuses, as mentioned before, and the transition mode code is defined as shown in Table I However, in the method of FIG. 2 according to the present invention, the status of the first unit area which is positioned at the head of the serial of unit areas is determined as a predetermined reference status. For example, if the status of the first unit area is the black-white mode shown in (a) of FIG. 1, the status of said first unit area is changed to a reference status such as the white-white mode shown in (b) of FIG. 2. Therefore, the status of the elemental area $a_n$ is changed from black to white. Since the status of the first unit area is fixed, it is not necessary to send the mode code which identifies the status of the first unit area. The sending signal code is composed in the order shown in (c) of FIG. 2. It should be understood the black-black mode, the black-white mode, or the white-black mode can also be used as the reference mode.

Further, it is understood that status mode codes which indicate the status of the unit area can be used in place of the transition mode codes. For example, in the status mode codes, "00" is used in white-white mode, "11" is used in black-black mode, "10" is used in white-black mode, and "01" is used in black-white mode.

If the information of the first unit area is changed to a reference status, the information of the original data will not be affected. Because of this, the information at the head of the scanning line is white in many cases and the length of the original corresponding to one bit of the picture signal is about 0.1 mm.

FIG. 3 shows another embodiment of the facsimile data compression method according to the present invention. The original figure (a) of FIG. 3 having a dual line like that shown in (a) of FIG. 1 is transformed as shown in (b) of FIG. 3. However, as shown in (b) of FIG. 3, a predetermined reference status is added prior to the first unit area. For example, a white-white mode status is added prior to the first unit area as shown in (b) of FIG. 3. A sending signal is composed in the order shown (c) of FIG. 3, i.e. synchronizing code + run length code of the reference status + transition code + run length code + . . .

This means that the addition of such a reference status mode does not require redundant bits and the compression efficiency can therefore be increased. In many cases, since the original picture begins with a white mode, it is not necessary to increase the length of the run length code. It is also possible to add a reference status signal prior to the first unit area and to delete the signal corresponding to the last unit area.

In the embodiment shown in FIG. 3, it is necessary to send the first mode which has already been fixed.

Figure 4:
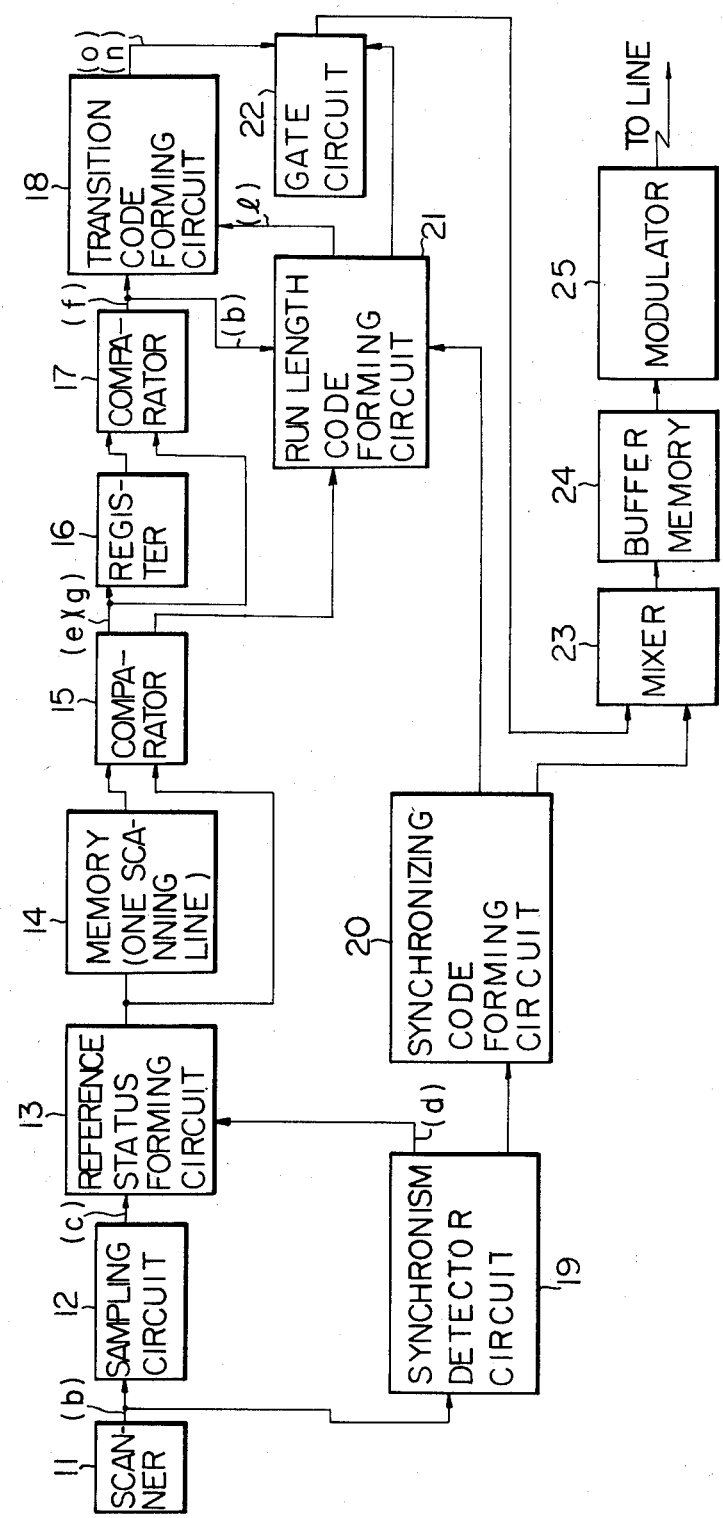
FIG. 4 is a block diagram of a transmitting side of the facsimile data communication system which carries out the method of the present invention.
Figure 5:
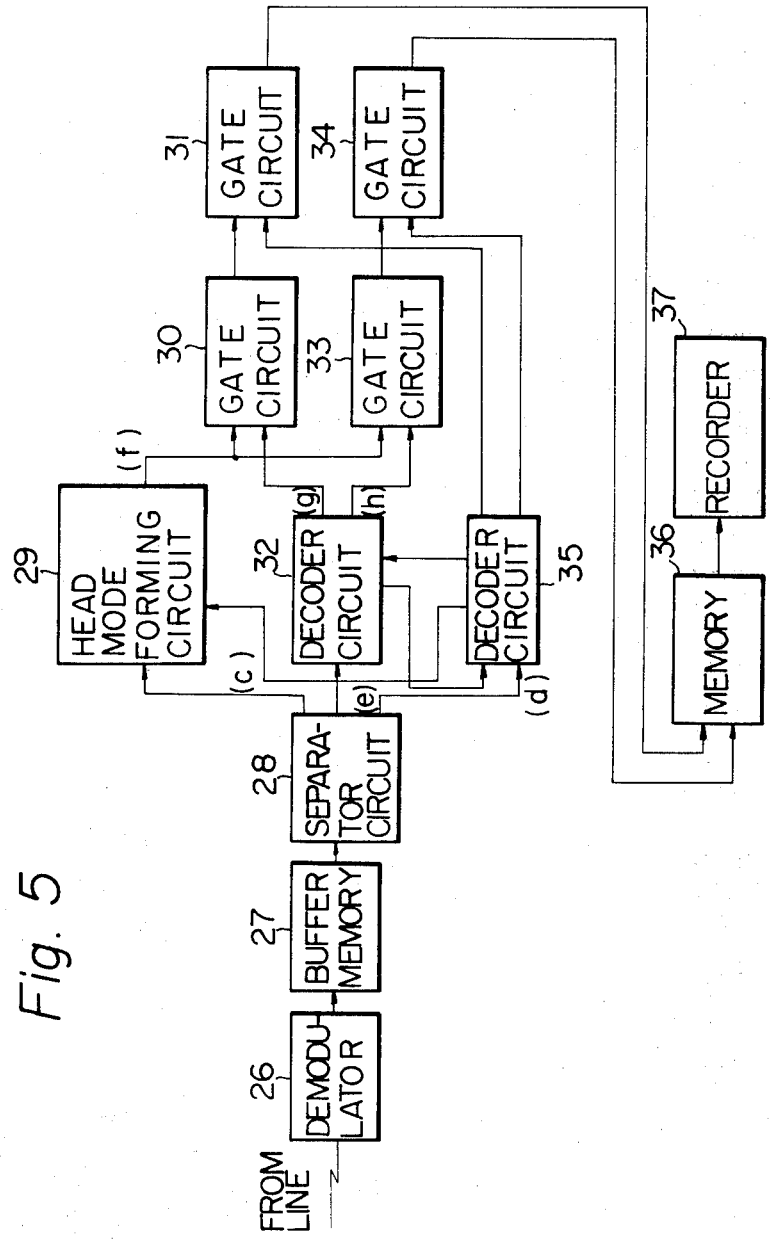
FIG. 5 is a block diagram of a receiving side of the system which carries out the method according to the present invention.

FIGS. 4 and 5 are block diagrams of the apparatus which carries out the facsimile data compression method of the present invention.

FIG. 4 shows a block diagram of the sending side of the apparatus, wherein an output of a scanner 11 is connected to a sampling circuit 12 and to a synchronism detector circuit 19, and the output of said sampling circuit 12 and the output of said synchronism detector circuit 19 are connected to a reference status forming circuit 13. The output of said status forming circuit 13 is connected to a memory 14 which stores the information of one scanning line. The output of said memory 14 is connected to a comparator 15. The output of said reference status forming circuit 13 is also directly to the comparator 15. The output of said comparator 15 is connected via a register 16 to a comparator 17 and said output of said comparator 15 is also directly connected to said comparator 17. The output of said comparator circuit 17 is connected to a transition code forming circuit 18 and to a run length code forming circuit 21. Another output of said comparator 15 is connected to said run length code forming circuit 21 and the output of the synchronism detector circuit 19 is also connected via a synchronizing code forming circuit 20 to said run length code forming circuit 21. The outputs of said transition code forming circuit 18 and said run length code forming circuit 21 are connected to a gate circuit 22. The output of said gate circuit 22 and the output of said synchronizing code forming circuit 20 are connected to a mixer 23, the output of which is connected via a buffer memory 24 to a modulator 25 which sends the data signal to a receiving side.

Referring to FIG. 5, the output of a demodulator 26 which receives the signal from the sending side is connected via a buffer memory 27 to a separator circuit 28. The separated output of said separator circuit 28 is connected to a head mode forming circuit 29, and to decoder circuits 32 and 35, respectively. The output of said head mode forming circuit 29 is connected to gate circuits 30 and 33. The outputs of said decoder circuit 32 is connected to said gate circuits 30 and 33, and another output of said decoder circuit 32 is connected to said decoder circuit 35. The outputs of said gate circuits 30 and 33 are connected to gate circuits 31 and 34, respectively. The output of said decoder circuit 35 is connected to said gate circuits 31 and 34. Another output of said decoder circuit 35 is connected to said head mode forming circuit 29. The outputs of said gate circuits 31 and 34 are connected via a memory 36 to a recorder 37.

In the circuits shown in FIGS. 4 and 5, the scanner 11 scans the original data by scanning lines, the scanned data is converted into electrical signals and a synchronizing signal is added to every scanned line. The electrical signal corresponding to the original data is supplied to the sampling circuit 12 where said electrical signal is sampled by sampling pulses having a predetermined period and the output of said sampling circuit 12 is supplied to the reference status forming circuit 13. The synchronizing detector circuit 19 detects the synchronizing signal from the output of said scanner 11 so that the status of the unit area which follows the synchronizing signal [$a_n$ in (a) of FIG. 2] is changed to the reference status, for example, "white."

The picture signal corresponding to one scanning line is stored in said memory 14 and the picture elements in one scanning line and the picture elements in the next scanning line are compared by the comparator circuit 15. Memory circuit 14 is composed of shift registers, and every time one bit of the picture element in one scanning line is received from said memory circuit 14, one bit of the picture element in the next scanning line is stored. Comparator circuit 15 compares the picture element $a_n$ in the $n$th line and the picture element $a_{n+1}$ in the $n + 1$th line and a signal which represents the mode corresponding to the combination of the statuses of the picture elements is sent from the comparator to the register 16 and to the comparator 17. The mode signal corresponding to row $a$ is stored in said register 16 and the status of the stored mode signal corresponding to said row $a$ is compared with the status of the mode signal corresponding to row $b$. With respect to the picture elements (row $a$) which follow the synchronizing signal, no compared output is generated from said comparator 17, since the signal to be compared is not stored in said register 16. When the change of the status of the unit area is detected by said comparator circuit 17, the transition code forming circuit 18 forms the transition code shown in TABLE I in accordance with the status change output of said comparator circuit 17. Each time said comparator circuit 15 compares the status of the picture elements, a clock pulse is sent to the run length forming circuit 21. Said clock pulse is counted by said circuit 21 which is then reset by the status change output of the comparator 17.

In this way, said run length forming circuit 21 can continue to count the clock pulses and to generate a run length code until a status change output is generated from the comparator 17. The synchronism detector circuit 19 detects the synchronizing signal which is sent from said scanner 11 and the detected output is sent to said reference status forming circuit 13 and to said synchronizing code forming circuit 20. Said synchronizing code forming circuit 20 forms one synchronizing code for every two scanning lines. The output of said synchronizing code forming circuit 20 resets said run length code forming circuit 21. Said output is also sent to an input terminal of the mixer 23. Since the transition code which is the output of said transition code forming circuit 18 and the run length code which is the output of said run length code forming circuit 21 are sent via the gate circuit 22 to another input terminal of said mixer 23, the synchronizing code, the transition code and the run length code are stored in the memory 24, so that these codes are impedance-matched to the transmission line, are modulated by the modulator 25 and are sent out to the transmission line.

The transmitted signal is received by the receiving side, is demodulated by the demodulator 26, is stored in the buffer memory 27 and is applied to the separator circuit 28, wherein the synchronizing code, the transition mode codes and the run length codes are separated. Said synchronizing code is supplied to the head mode forming circuit 29, where the signal which shows the picture status of the reference status, such as white, is generated. Said transition mode code is supplied to the decoder circuit 32, so that the signals which show the picture status of the new unit area after transition, are supplied to the gate circuits 30 and 33, respectively. That is, the picture status in the $n$th line is supplied to the gate circuit 30 and the status in the $n + 1$th line is supplied to the gate circuit 33. The run length code is decoded by a decoder circuit 35, so that said circuit 35 generates pulses the number of which correspond to the run length. Said pulses are then supplied to the gate circuite 31 and 34. The output of said gates 30 and 33, that is, the signals which show the picture status, are also supplied to said gate circuits 31 and 34 respectively. Said gate circuit 31 generates the picture signal of the $n$th line while said gate circuit 34 generates the picture signal of the $n + 1$th line. These signals are then stored in the memory 36. The picture signal of said $n$th line is recorded in the recorder 37, after which the picture signal of said $n + 1$th line is also recorded therein.

Figure 6A:
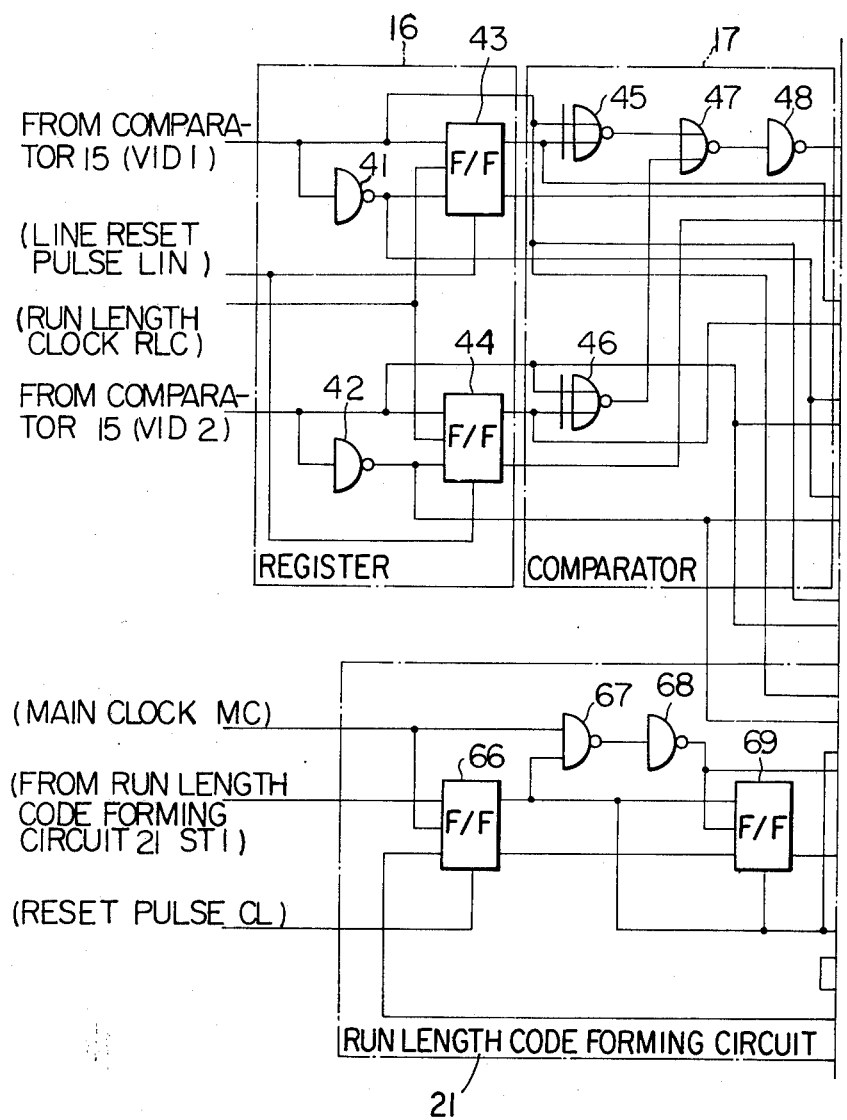
FIGS. 6a and 6b are a detailed circuit of a part of a register, a part of a comparator and a part of a transition code forming circuit of the block diagram shown in FIG. 4.
Figure 6B:
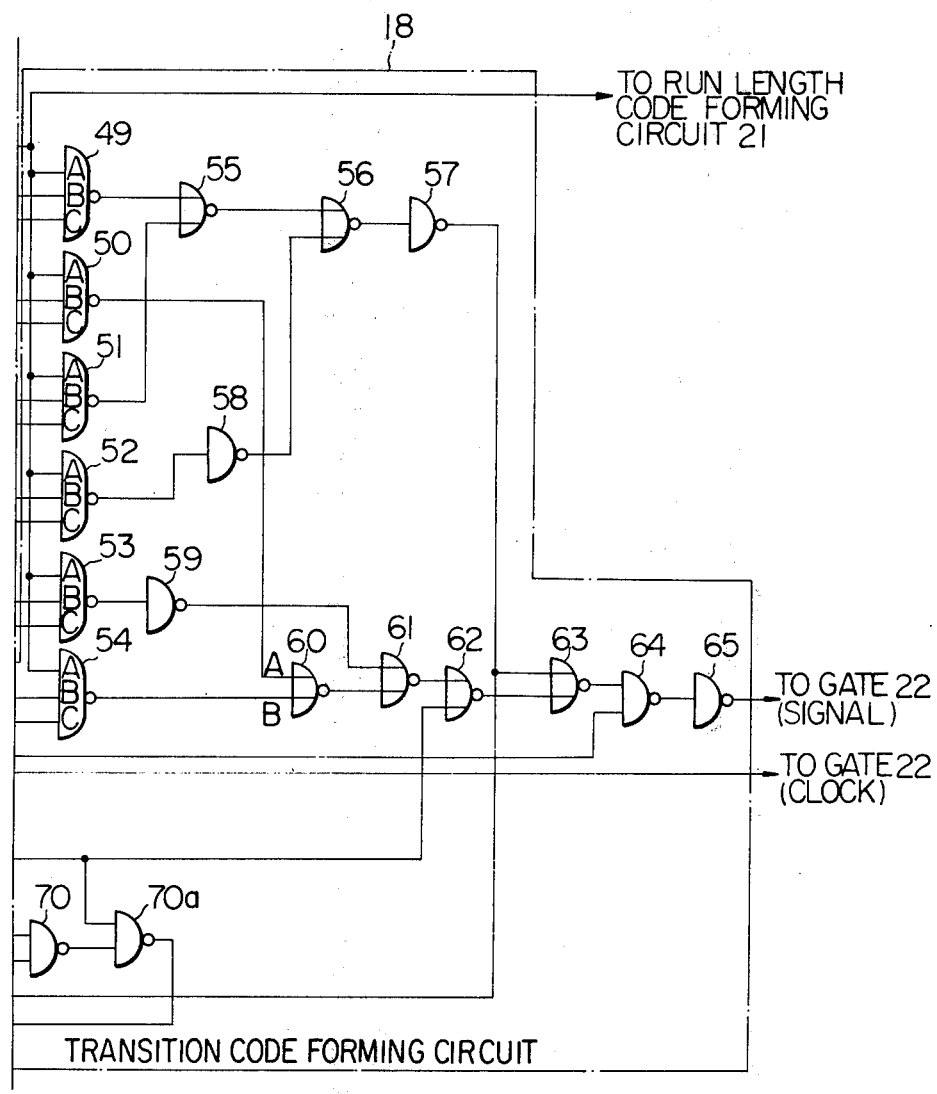

Next, the function of the block diagrams 4 and 5 will be explained in more detail with reference to FIGS. 6-10. Waveforms (a), (b) and (c) of FIG. 7 show the relationship of the outputs of the scanner 11 to the outputs of the sampling circuit 12, with respect to the sampling pulses. When signals $VID_1$ and $VID_2$ shown in (e) and (g) of FIG. 7 are applied from the output of the comparator 15 to flip-flops 43 and 44 respectively, the signals $VID_1'$ and $VID_2'$ appear at the output Q of said flip-flops 43 and 44, respectively. Mode signals in row $b$ of said signals $VID_1$ and $VID_2$ are compared with mode signals in row $a$ of said signals $VID_1'$ and $VID_2'$ at the Exclusive OR circuits 45 and 46, respectively. When the status change is detected at either the Exclusive OR circuit 45 or 46, the output of the NOR circuit 55 is changed from a high level signal to a low level signal, whereby the output of the NOT circuit 48 is changed from a low level signal to a high level signal. When the output of said NOT circuit 48 attains a high level status, input terminals A of NAND circuits 49-54 also reach high level statuses, and status signals $VID_1$, $VID_2$, $VID_1'$ and $VID_2'$ are supplied to input terminals B, and C of said NAND circuits 49-54, as shown in FIG. 6.

The mode signals shown in Table I are formed by the input signals to the input terminals B, C of said NAND circuits 49-54.

(a) Transition mode signal "0":

Transition mode signal "0" is formed by the NAND circuits 49, 51 and 52. The input terminal B of said NAND circuit 49 receives the signal $\overline{VID_1'}$ from the output Q of flip-flop 43 and the input terminal C of said NAND circuit 49 receives the signal $\overline{VID_2'}$ from the output Q of flip-flop 44. Signal $VID_1$ is supplied to both the input B of said NAND circuit 51 and to an input J of said flip-flop circuit 43, and signal $VID_2$ is supplied to both the input C of said NAND circuit 51 and to an input J of said flip-flop circuit 44. This means that the status is changed from $a_n$, $a_{n+1}$ (white-white) to $b_n$, $b_{n+1}$ (white-black), that the inputs A, B and C of the NAND circuits 49 and 51 attain a high level status, that inputs A, B of said NOR circuit 55 have a low level status and that the output of the NOR circuit 55 has a high level status. Therefore, the output of said NOR circuit 51 becomes low, the output of said NOT circuit 57 becomes high, and said high level output of said NOT circuit 57 is supplied to an input B of a NAND circuit 70.

When a transition mode code starting signal $ST_1$ is supplied to a flip-flop circuit 66 from the run length code forming circuit 21, said flip-flop circuit 66 is actuated by the clock pulse MC which is applied thereto, and the output of said circuit 66 attains a high level status. Therefore, the output of said NAND circuit 70 has low level status and the output of the NAND circuit 70a has a high level status. Said high level status of said NAND circuit 70a is supplied to an input k of the flip-flop circuit 66. The output Q of said flip-flop circuit 66 is given a low level status by the next clock pulse and the operation of the flip-flop circuit 66 ceases. When the output Q of the flip-flop 66 has a high level status, the output of the NOT circuit 57 is also high. Therefore, the output of the NOR circuit 63 becomes low, the output of the NAND circuit 64 becomes high and the output of the NOT circuit 65, that is, the output signal of the circuit 18 becomes low.

When the output Q of said flip-flop circuit 26 is high, the input A of the NAND circuit 67 receives clock pulses and the input B of said circuit is also high. Said flip-flop circuit 66 is actuated by both the transition mode code starting signal $ST_1$ and by the clock pulse and said circuit 66 is deactuated by the next clock pulse. Therefore, only one clock pulse appears at the output of the NAND circuit 67, which clock pulse is supplied from the circuit 18 to the gate circuit 22.

Inputs B and C of the NAND circuit 52 receive signals $\overline{VID}_1$, $\overline{VID}_2$, respectively. This means that the status is changed from $a_n$, $a_{n+1}$ to $b_n$, $b_{n+1}$ (white-white). Therefore, the output of said NAND circuit 52 becomes low, the output of said NOT circuit 58 becomes high, the output of said NOR circuit 56 becomes low and the output of said NOT circuit 57 becomes high. The same explanation as mentioned above is also applicable.

(b) Transition mode signal "10":

Transition mode signal "10" is formed by the NAND circuits 50 and 54. For example, when the status is changed from $a_n$, $a_{n+1}$ (black-black) to $b_n$, $b_{n+1}$ (black-white), inputs B and C of the NAND circuits 50 and 54 attain high level statuses. Therefore, inputs A and B of NOR circuit 60 become low, the output of said circuit 60 becomes high, and the output of the NOR circuit 61 and input of the NOR circuit 62 both become low. In this state, the run length code is finished, and the transition mode code starting signal $ST_1$ is supplied to the flip-flop circuit 66. Therefore, said flip-flop circuit 66 is actuated by the clock pulse MC and the output of the circuit 66 has a high level status. However, since the input B of the NAND circuit 30 is low, the action of the flip-flop circuit 66 is not finished by the next clock pulse. The flip-flop circuit 69 is actuated by the first clock pulse and, thereafter, the status of the output Q of the circuit 69 is changed from a high level status to a low level status. Therefore, the output of the NAND circuit 71 becomes high, and the input K of the flip-flop 66 also becomes high, so that the actuation of the circuit 66 is finished by the second clock pulse. Therefore, two clock pulses are sent to the gate 22 by the flip-flop circuit 66.

Because input A of the NOR circuit 22 is low and because the input B of the NOR circuit 22 is changed from high level at the first clock pulse to low level at the second clock pulse, the output of said circuit is changed from a low level to a high level. Since the input A of the NOR circuit 63 has a low level status and since the input B of said circuit 63 is changed from low level to high level, the output of said circuit which is supplied to an input A of the NAND circuit 64 is changed from high level to low level. Because the output Q of the flip-flop 66 is supplied to the input B of the NAND circuit 64, said input is maintained at a high level condition until the second clock pulse. Therefore, the output of the NAND circuit 64 which is supplied to the input of the NOT circuit 65 is changed from low level to high level, so that the output of said NOT circuit 65, that is, the signal output of the circuit 18, becomes high at the first clock pulse and low at the second clock pulse. In other words, the tansition mode is "10."

When row $b_n$, $b_{n+1}$ is black-black, the inputs A, B and C of the NAND circuit 53 becomes high, the output of said circuit 53 which is supplied to the input A of the NOT circuit 59 becomes low, and the output of said NOT circuit 59 becomes high. Said high level output is supplied to the input A of the NOR circuit 21 and an output "10" is generated in this circuit 18.

(c) Transition mode signal "11":

Similar to the above-mentioned items (a) and (b), the output of the NOT circuit 48 attains a high level status. However, the outputs of the NAND circuits 49–54 do not become high. When the run length code is finished, the transition mode starting signal $ST_1$ is supplied to the flip-flop circuit 66 and the output of said circuit 66 becomes high. However, the output of the NOT circuit 57 is low, the flip-flop 66 continues its actuation until the second clock pulse of the clock pulses MC, and the output of the NOR circuit 63 is high and is supplied to the input A of the NAND circuit 64. The output Q of the flip-flop circuit 66 is supplied to the input B of the NAND circuit 64. Therefore, the output of said NAND circuit 64 has a low level status which is supplied to the input of the NOT circuit 65 and the output of said circuit becomes high, i.e. "11," which is sent to the gate circuit 22.

FIG. 7 shows a time chart with regard to the above-mentioned function of the circuit shown in FIG. 6 with respect to (b) of FIG. 2.

Figure 8A:
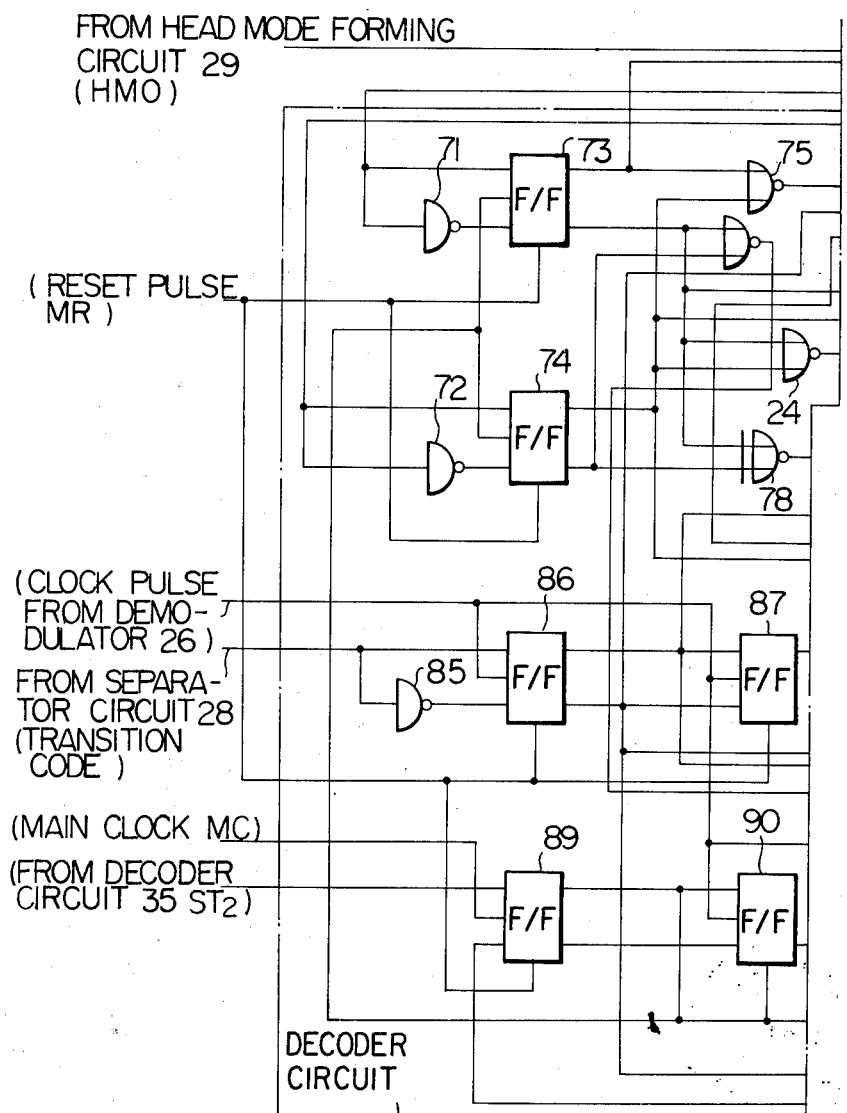

Referring to FIG. 8, reset pulses MR are supplied to reset flip-flops 73, 74, 86 and 87, and a head mode forming code is supplied from the head mode forming circuit to place a white mode at the head of the dual line data. Clock pulses RT are supplied from the demodulator 26 to decoder circuit 32 and transition codes TC are supplied from the separator circuit 28 where said transition codes are separated from the received signal to said circuit 32. Main clock MC has a frequency several times high than the clock RT. A transition mode decoding start pulse $ST_2$ is supplied from the run length decoder circuit 35 to said circuit 32.

Because the flip-flops 73 and 74 are reset by a reset pulse MR, the status of $a_n$, $a_{n+1}$ becomes white-white. A transition mode decoding state pulse $ST_2$ is supplied from the decoder circuit 35 to a flip-flop 89 and the output Q of said flip-flop circuit 89 becomes high. Next, a flip-flop 90 is actuated by a clock pulse RT from the demodulator 26. When the flip-flop 90 is actuated, flip-flops 86 and 87 shift the transition code TC by said clock pulse RT. For example, if the transition code "11" is shifted, the output of the exclusive OR circuit 78 becomes high because the output Q of said flip-flops 73 and 74 are both high, that is, have a white-white status. Said high output of the exclusive OR circuit 78 is supplied to a NOT circuit 79 and to an input A of a NAND circuit 81. The transition mode "11" appears at the outputs of the flip-flops 86 and 87, the inputs B and C of said NAND circuit 81 become high and the output of said circuit 81 becomes low. Because the input B of a NAND circuit 84 is low, the output of said circuit 84 attains a high level which is supplied to the input J of flip-flop circuit 73. Because inputs A and B of a NAND circuit 88 are high, the output of said circuit 88 becomes low and is supplied to the input J of flip-flop 74.

Flip-flop 90 is actuated by the first clock pulse after flip-flop 89 is operated. Therefore, the input A of the NAND circuit 92 becomes high. Since the flip-flop 86 shifts the transition mode "11" by one pulse, the input B of the NAND circuit 92 becomes low and the output of said circuit 92 becomes high and is supplied to an input B of a NAND circuit 93. And, because a flip-flop 91 is not operated at the first clock pulse, the output Q of said flip-flop 91 is high and the output of the NAND 93 becomes low. Said flip-flop 91 continues to operate until the second flock (RT) is finished. When the operation of flip-flop 89 is finished, said flip-flop 89 resets flip-flops 73 and 74. At this time, the output (the $n$th line) of the flip-flop 73 becomes high (black) and the output (the $n+1$th line) of the flip-flop 74 becomes low (white).

Figure 9B:
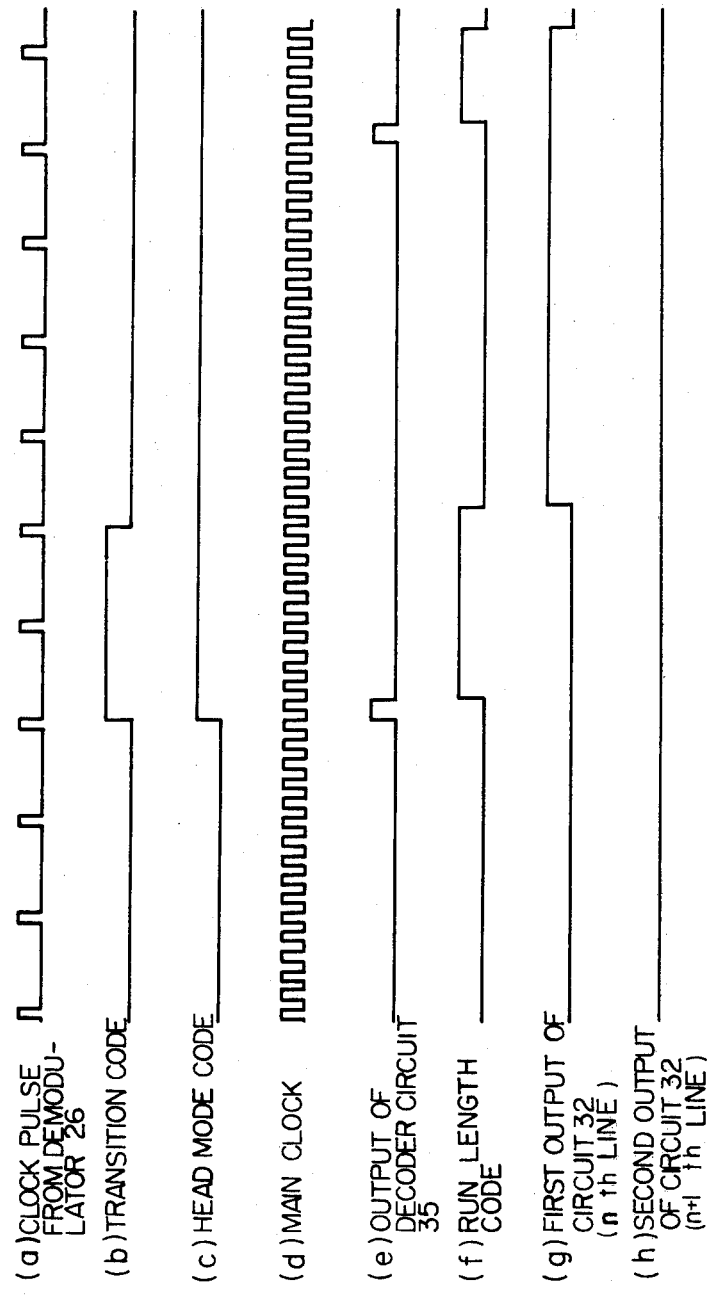

The time chart with regard to the operation of the circuit shown in FIG. 8 is shown in FIG. 9A, and the portion within the square of dotted line B, is enlarged in FIG. 9B.

Figure 10:
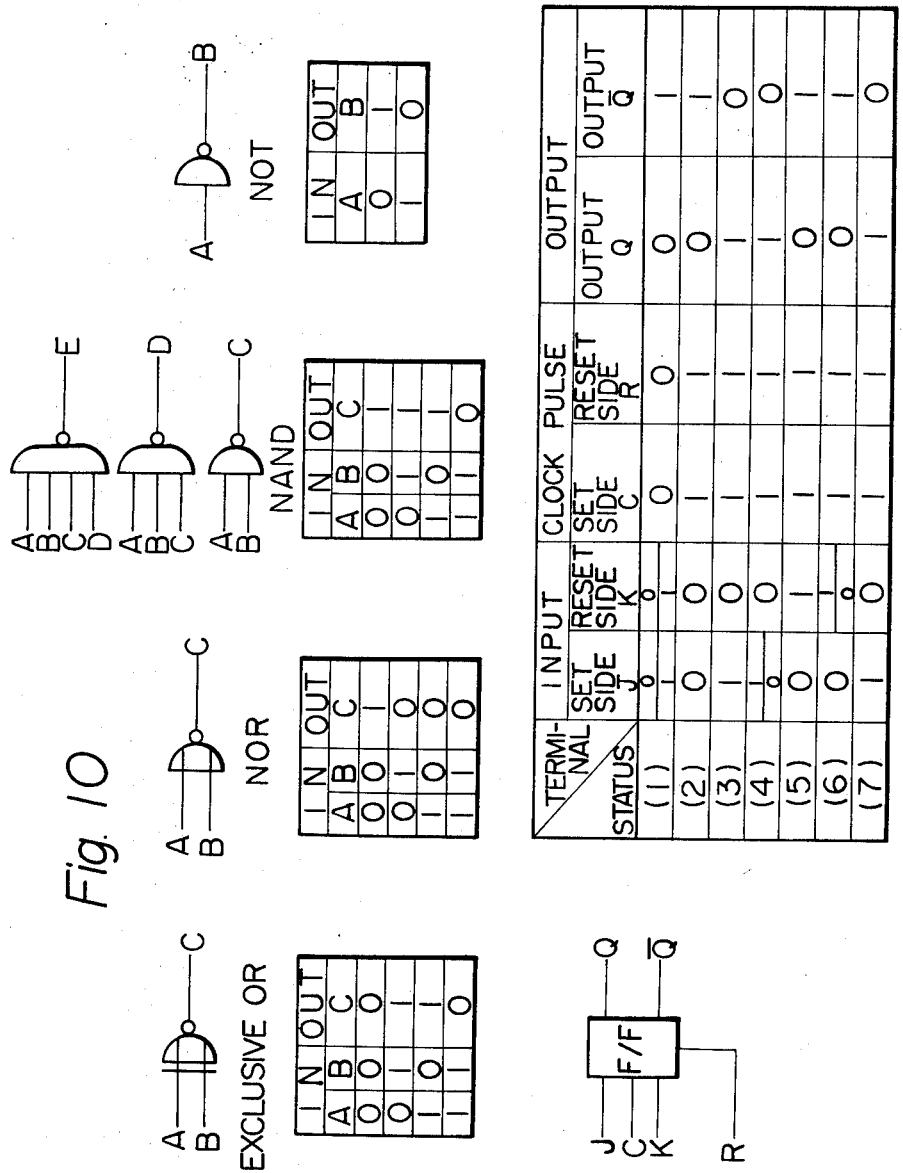
FIG. 10 shows the relation between symbol marks and the truth value table of the unit element used in the circuit shown in FIGS. 6 and 8.

The symbol marks and the truth value table of the elements used in FIG. 6 and 8 are shown in FIG. 10.

It is, of course, understood that the present invention can be applied to single line scanning data and to scanning data which is scanned by more than three lines, as well as to a dual line scanning system.

What is claimed is:

1. A facsimile data compression apparatus comprising:
    a scanner which scans the original figure with scanning lines;
    a sampling circuit which samples the output signal of said scanner;
    a synchronism detector which detects the synchronizing signal from the output of said scanner;
    a reference status forming circuit which generates the reference status based on the output of said sampling circuit and said synchronizing signal;
    a first comparator circuit which compares the upper picture elements lying in the $n$th scanning line and the lower picture elements lying there-beneath in the $n + 1$th scanning line and generates status signals corresponding to a combination of said upper picture element and said lower picture element;
    a second comparator circuit which successively compares said status signals generated from said first comparator circuit and generates transition signals when the status change is detected between said status signals;
    a transition code forming circuit which forms transition codes in accordance with said transition signals of said second comparator circuit;
    a run length code forming circuit which receives said status signals of said first comparator and said transition signals of said second comparator and generates the run length codes in accordance with the length of said status signals having the same status;
    a mixer circuit which mixes said synchronizing codes, said transition codes and said run length codes and then sends out said codes to a transmission line;
    a separator circuit which separates said synchronizing codes, said transition codes and said run length codes from the received signal via said transmission line;
    a head mode forming circuit which receives said synchronizing code from said separator circuit and forms the head mode state;
    a first decoder and a second decoder which decode said transition code and said run length codes received from said separator circuit;
    a group of gate circuits which receive the outputs of said head mode forming circuit and said first and second detectors so as to reproduce the information of said original figure.

2. A facsimile data compression method for compressing data representing an original figure, said method comprising the steps of:
    scanning the original figure along adjacent scan lines which comprise successive picture elements, each successive elemental area being characterized by a respective picture condition, so as to develop successive scan signals for each adjacent scan line, said successive scan signals representing the conditions of the successively scanned elemental areas;
    converting the first one of said scan signals in each of said adjacent scan lines to a reference signal corresponding to a predetermined picture condition for said first one of said elemental areas in each scan line; and
    encoding said successive scan signals including said converted first one of said scan signals to form a compressed encoded signal representing said successively scanned lines of said original figure.

3. A facsimile data compression method according to claim 2, wherein said predetermined reference picture condition is a white elemental area.

4. A facsimile data compression method according to claim 2, wherein said encoding step includes the steps of:
    combining a selected number of said converted scan signals to define a combined signal representing the encoded set being composed of one elemental area from each line with all elemental areas in a set being contiguous; and
    developing said compressed encoded signal from said combined signal.

5. A facsimile data compression method according to claim 2, wherein said encoding step includes the use of state codes, each of which indicates the state of said scan signal, and run length codes which indicate the lengths of the state of said scan signals which are continuously in the same state, said compressed encoded signal not including the code representing the signal state of the head of said scan signals.

6. A facsimile data compression method for compressing data representing an original figure, said method comprising the steps of:
    scanning the original figure along adjacent scan lines which comprise successive picture elements, each successive elemental area being characterized by a respective picture condition, so as to develop successive scan signals for each adjacent scan line, said successive scan signals representing the conditions of the successively scanned elemental areas;

adding a predetermined reference signal at the head of said scan signals in a scan line, said reference signal corresponding to a predetermined picture condition for said first one of said elemental areas in each scan line; and encoding said successive scan signals including said added first one of said scan signals to form a compressed encoded signal representing said successively scanned lines of said original figure.

7. A facsimile data compression method according to claim 6, wherein said predetermined reference picture condition is a white elemental area.

8. A facsimile data compression method according to claim 6, wherein said encoding step includes the steps of:

combining a selected number of said converted scan signals to define a combined signal representing the encoded set being composed of one elemental area from each line with all elemental areas in a set being contiguous; and developing said compressed encoded signal from said combined signal.

9. A facsimile data compression method according to claim 6, wherein said encoding step includes the use of state codes, each of which indicates the state of said scan signal, and run length codes which indicate the lengths of the state of said scan signals which are continuously in the same state, said compressed encoded signal not including the code representing the signal state of the head of said scan signals.

10. A facsimile data compression system comprising:

means for scanning an original figure along adjacent scan lines which comprise successive picture elements, each successive elemental area being characterized by a respective picture condition, so as to develop successive scan signals for each adjacent scan line, said successive scan signals representing the conditions of the successively scanned elemental areas;

means for converting the first one of said scan signals in each of said adjacent scan lines to a reference signal corresponding to a predetermined picture condition for said first one of said elemental areas in each scan line; and means for encoding said successive scan signals including said converted first one of said scan signals to form a compressed encoded signal representing said successively scanned lines of said original figure.

11. A facsimile data compression method according to claim 10, wherein said predetermined reference picture condition is a white elemental area.

12. A facsimile data compression system according to claim 10, wherein said encoding means includes:

means for combining a selected number of said converted scan signals to define a combined signal representing the encoded set being composed of one elemental area from each line with all elemental areas in a set being contiguous; and means for developing said compressed encoded signal from said combined signal.

13. A facsimile data compression system according to claim 10, wherein said encoding means includes means for using state codes, each of which indicates the state of said scan signal, and run length codes which indicate the lengths of the state of said scan signals which are continuously in the same state, said compressed encoded signal not including the code representing the signal state of the head of said scan signals.

14. A facsimile data compression system comprising:

means for scanning an original figure along adjacent scan lines which comprise successive picture elements, each successive elemental area being characterized by a respective picture condition, so as to develop successive scan signals for each adjacent scan line, said successive scan signals representing the conditions of the scanned elemental areas;

means for adding a predetermined reference signal at the head of said scan signals in a scan line, said reference signal corresponding to a predetermined picture condition for said first one of said elemental areas in each scan line; and means for encoding said successive scan signals to form a compressed encoded signal representing said successively scanned lines of said original figure.

15. A facsimile data compression method according to claim 14, wherein said predetermined reference picture condition is a white elemental area.

16. A facsimile data compression system according to claim 14, wherein said encoding means includes:

means for combining a selected number of said converted scan signals to define a combined signal representing the encoded set being composed of one elemental area from each line with all elemental areas in a set being contiguous; and means for developing said compressed encoded signal from said combined signal.

17. A facsimile data compression system according to claim 16, wherein said encoding means includes means for using state codes, each of which indicates the state of said scan signal, and run length codes which indicate the lengths of the state of said scan signals which are continuously in the same state, said compressed encoded signal not including the code representing the signal state of the head of said scan signals.

* * * * *

UNITED STATES PATENT OFFICE
CERTIFICATE OF CORRECTION

Patent No. 4,048,656          Dated September 13, 1977

Inventor(s) ATSUSHI ISHII et al

It is certified that error appears in the above-identified patent and that said Letters Patent are hereby corrected as shown below:

Column 6, line 11, "circuite" should be --circuits--.
Column 6, line 53, "Q" should be --$\bar{Q}$--.
Column 6, line 55, "Q" should be --$\bar{Q}$--.
Column 7, line 55, "Q" should be --$\bar{Q}$--.
Column 8, line 13, "tansition" should be --transition--.
Column 8, line 16, "becomes" should be --become--.
Column 8, line 52, "high" should be --higher--.
Column 8, line 67, "Q" should be --$\bar{Q}$--.
Column 9, line 21, "Q" should be --$\bar{Q}$--.

Signed and Sealed this

Twenty-eighth Day of February 1978

[SEAL]

Attest:

RUTH C. MASON
*Attesting Officer*

LUTRELLE F. PARKER
*Acting Commissioner of Patents and Trademarks*